William R. Downs
INVENTOR.

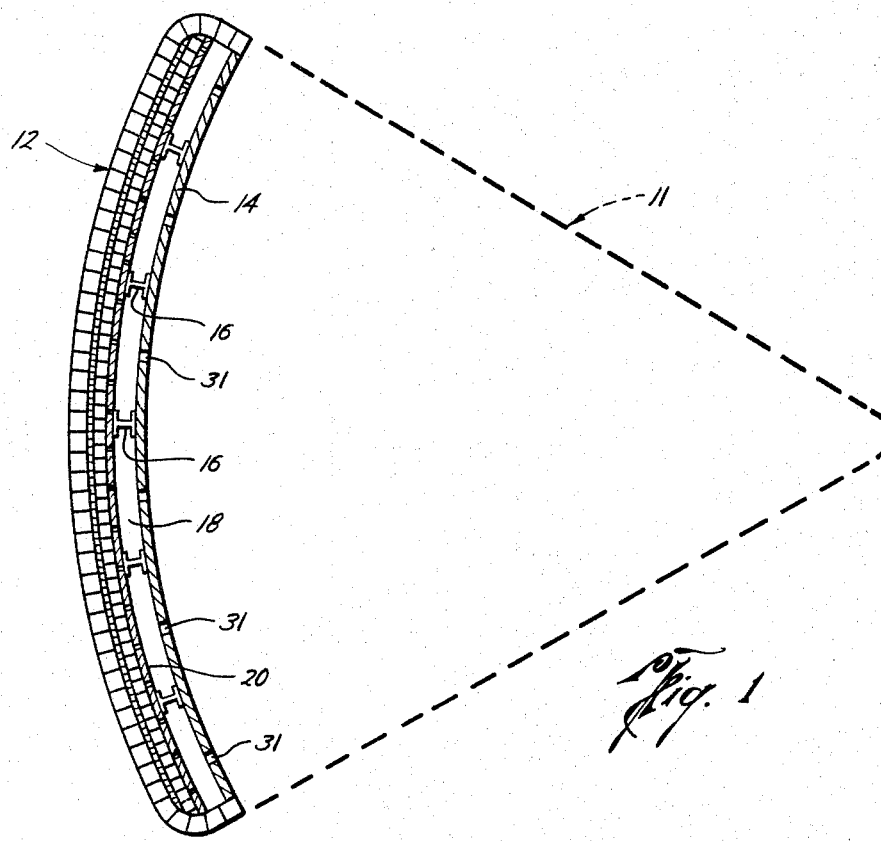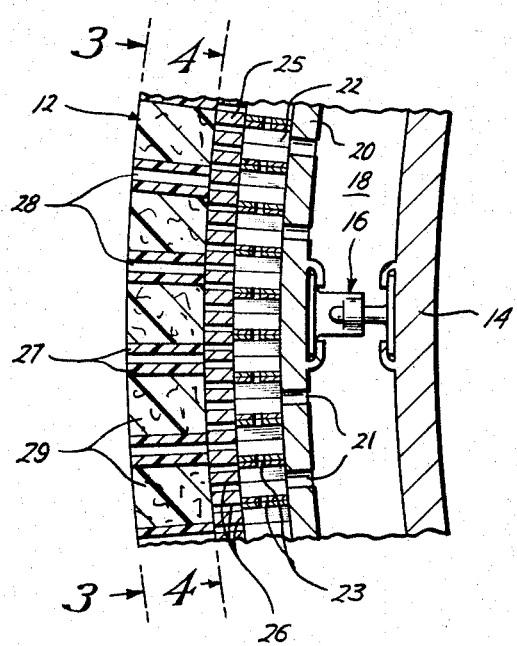

ATTORNEY

May 23, 1967          W. R. DOWNS          3,321,154
TRANSPIRATIONALLY COOLED HEAT ABLATION SYSTEM
Filed July 14, 1965          4 Sheets-Sheet 4
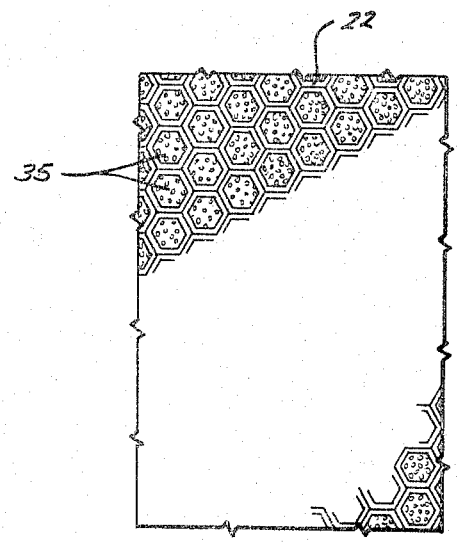
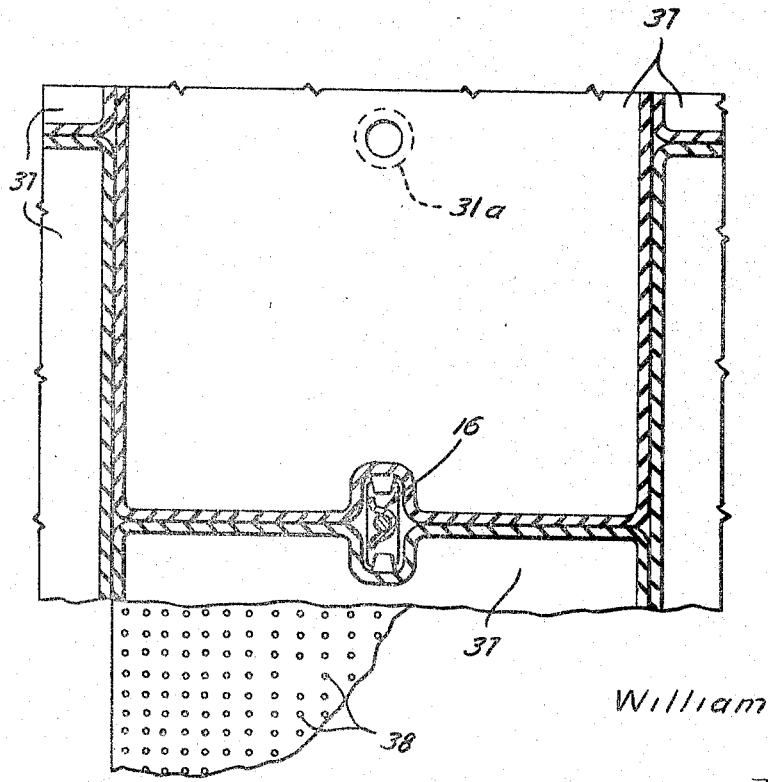
William R. Downs
INVENTOR.
BY
ATTORNEY 3,321,154
TRANSPIRATIONALLY COOLED HEAT
ABLATION SYSTEM William R. Downs, Houston, Tex., assignor to the United States of America as represented by the Administrator of the National Aeronautics and Space Administration
Filed July 14, 1965, Ser. No. 472,066
8 Claims. (Cl. 244—1)

ABSTRACT OF THE DISCLOSURE

A system for protecting a spacecraft or like vehicle from the intense heat generated when said vehicle reenters the Earth's atmosphere which comprises a heat ablative means adapted to be secured to the leading edge of said vehicle. The ablative means has passages therethrough which are adapted to communicate with a source of fluid within the vehicle wherein fluid can be supplied to the exposed surface of the ablative means to cool same during early moments of reentry.

The invention described herein was made by an employee of the United States Government and may be manufactured and used by or for the Government for governmental purposes without the payment of any royalties thereon or therefor.

This invention relates to a thermal protection system for interplanetary vehicles and more particularly relates to a heat insulating and ablative system for space vehicles wherein the heat protection structure is temporarily cooled during early moments of reentry by fluid transpired through said structure.

When a space vehicle reenters the Earth's atmosphere it has a large amount of kinetic energy which must be disposed of in a controlled manner in order for the vehicle to survive. A portion of this energy is transferred to the atmosphere as kinetic energy and heat energy, but the remainder of the energy, which appears as the aerodynamic heat input to the vehicle, is of such magnitude that its disposal constitutes a major problem to the vehicle's reentry. The greater portion of this areodynamic heat input comes from a region of high temperature gases known as the shock layer which is formed upon the vehicle's reentry into the atmosphere. The gases from the shock layer flow around the vehicle and heat is transferred from these gases to the vehicle in the form of both radiative heat and convective heat.

In space flights where the vehicle has a relatively low reentry speed, such as in orbital and lunar flights, radiative heat from the shock layer makes up only a small percentage of the total heat input and does not constitute a major problem. However, at reentry speeds such as may be encountered by interplanetary vehicles, the radiative heat from the shock layer will constitute a significantly greater percentage of the total heat input, and accordingly it becomes a major concern in designing an adequate heat protection system. For example, it is estimated that for a vehicle reentering the earth's atmosphere from Mars, up to ninety percent of the heat input to the vehicle could be radiative heat. Since this radiative heat is primarily a function of velocity of the vehicle, most of the radiative heat will occur during the early moments of reentry when the velocity of the vehicle is the greatest. Thus, the heat protection systems of interplanetary vehicles must deal effectively with a substantial amount of radiative heat during the initial stage of reentry, as well as with the usual substantial amount of convective heat which is always present during reentry.

Because of their limited capacity to radiate large amounts of heat in relation to their weight, metallic heat shields have long been abandoned as means for heat protection for high velocity reentry vehicles. Highly developed systems utilizing ablator materials have replaced these heavier and less efficient metallic shields and have proved highly successful in protecting those reentry vehicles which have relatively low reentry speeds. These ablative systems usually consist of a composite of phenolic, epoxy, or similar resin reinforced with fiberglass, asbestos, or other refractory fiber in the form of either random or oriented fibers, or in the form of a honeycomb matrix whose cells are filled with said ablator material. Such ablative systems upon reentry heating, form distinct layers wherein the inner layer adjacent the bulkhead of the vehicle remains essentially unaffected, while the outer layer pyrolyzes to form a char. This char will accumulate to form a thick layer which is retained by the reinforcing material. The exposed surface of this reinforced char undergoes melting, vaporization, and oxidation, and these effects, together with aerodynamic shear and pressure forces, limit the growth of the char layer. Within the char itself, conduction of heat inwards toward the pyrolysis zone is partly offset by the transpiration of gases outward to the surface, and the subsequent introduction of these relatively cool gases into the external flow provides cooling. Since the char has a high carbon content, it can sustain high surface temperatures and radiate an appreciable amount of heat. Moreover, since pyrolysis takes place at a relatively low temperature, little conduction of heat takes place within the unaffected or virgin layer of the ablator.

As set forth above, these ablative systems are highly efficient for low viscosity reentries since the majority of the heat input is convective heat and only a small percentage is radiative heat. However, as the reentry speed of the vehicle increases, so does the percentage of radiative heat, so that at reentry speeds of interplanetary vehicles, the radiative heat constitutes the major portion of the heat input. Although ablative systems can radiate relative large amounts of heat, they would have to be extremely large and accordingly heavy to adequately dissipate the radiative heat encountered by an interplanetary vehicle upon its reentry. Therefore, since weight is a critical factor in space flight, ablative systems, per se, do not appear practical for high velocity reentry vehicles.

The present invention allows the highly desirable qualities of light weight ablator systems to be utilized, and at the same time overcomes the inability of such systems to cope with the extreme radiative heat present during a high speed reentry. This is done by providing a means in the system for independently cooling the leading surface of the ablator during the early, crucial moments of reentry when the amount of radiative heating is at its highest point. The ablator shield utilized in the invention is of the same basic type presently being used in manned spacecraft. It comprises a non-metallic honeycomb matrix bonded to a metal substrate with the cells of the honeycomb being filled with a phenolic, epoxy, or similar resin. The shield of the present invention, however, is constructed so as to provide open passageways through the ablator material. Such passageways can be provided by drilling small holes through the ablator or, as illustrated below, a special honeycomb construction having passages therethrough can be used.

Spacer-type supports are used to mount the shield on the bulkhead of the spacecraft so that a chamber is formed between the bulkhead and the shield. This chamber, which communicates with the passages in the ablator, is pressurized with a desired cooling fluid an instant before reentry; said fluid passing through the passages in the ablator and onto the surface thereof to establish a boundary layer over the fore surfaces of the shield. This boundary layer serves to conduct away some of the heat kinetically produced, and more importantly provides a high degree of shielding against back-radiation of heat from the incandescent boundary. This back-radiation of heat occurs when the incandescent boundary becomes heated to the point where it will no longer dissipate the re-radiated heat from the shield, but instead "back-radiates" it toward the shield. The constantly out-gassing of the cooling fluid under pressure provides the necessary protection for the ablative structure against the extreme radiative and back-radiative heat developed during the early moments of reentry.

In the present system excess fluids which are normally available aboard the spacecraft near the end of its mission (e.g., urine, fluids produced by fuel cells, unspent drinking water, etc.) can be used as the transpiration cooling fluid or to supplement same, so there are no extremely large increases in the weight of the spacecraft, this being a vital consideration in spaceflight. Also, the ionized plasma layer which normally forms on reentry and interferes with communications between the spacecraft and Earth, is partially neutralized by the injected transpirational fluids so that at least partial contact with the spacecraft can be maintained during reentry.

The above mentioned and other advantages of the invention will be more readily appreciated as the invention becomes better understood by reference to the following detailed description when considered in connection with the accompanying drawings in which like reference numerals designate like parts throughout the figures and in which:

FIG. 1 is a side view, partly in section, of the heat ablative system in accordance with the present invention, mounted on a spacecraft, said spacecraft being shown in broken lines;

FIG. 2 is an enlarged partial vertical sectional view of the heat ablative system of FIG. 1;

FIG. 7 is a sectional view of the ablative structure taken along line 7—7 of FIG. 6; and FIG. 8 is a sectional view of the ablative structure taken along line 8—8 of FIG. 7.

Figure 3:
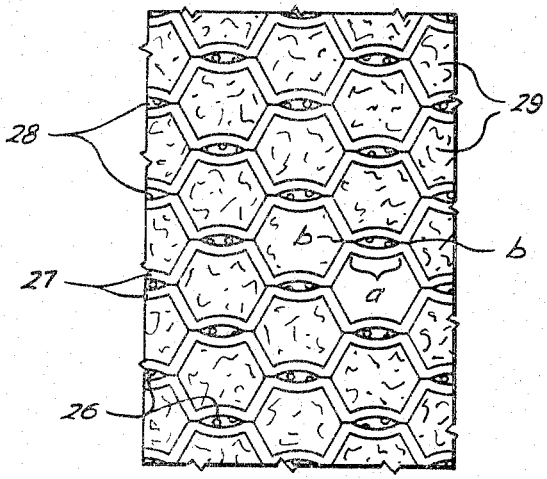
FIG. 3 is a top view of the ablative structure taken along line 3—3 of FIG. 2.
Figure 4:
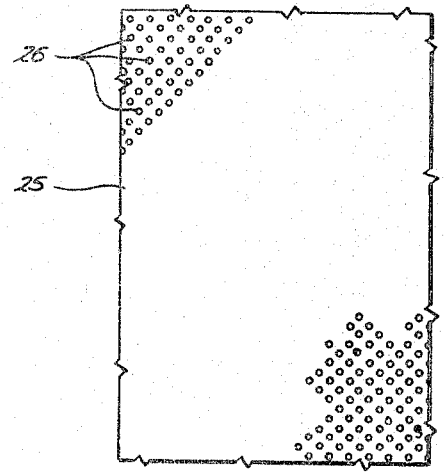
FIG. 4 is a sectional view of the ablative structure taken along line 4—4 of FIG. 2.
Figure 5:
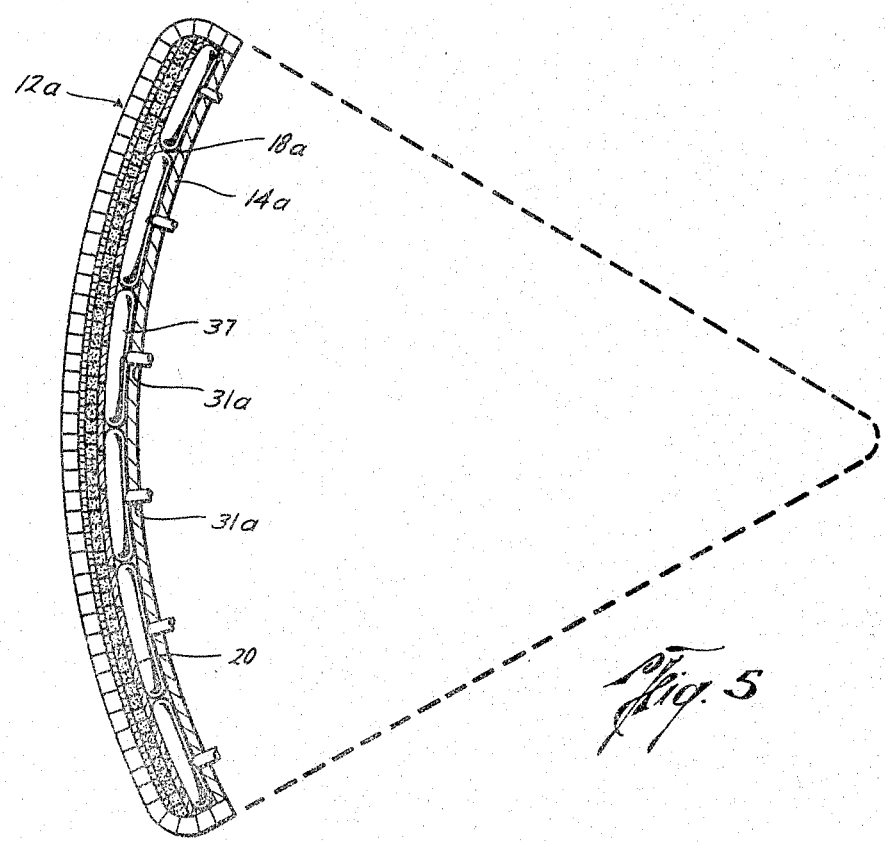
FIG. 5 is a side view, partly in section, of a modified form of the heat ablative system mounted on a spacecraft, said spacecraft being shown in broken lines.
Figure 6:
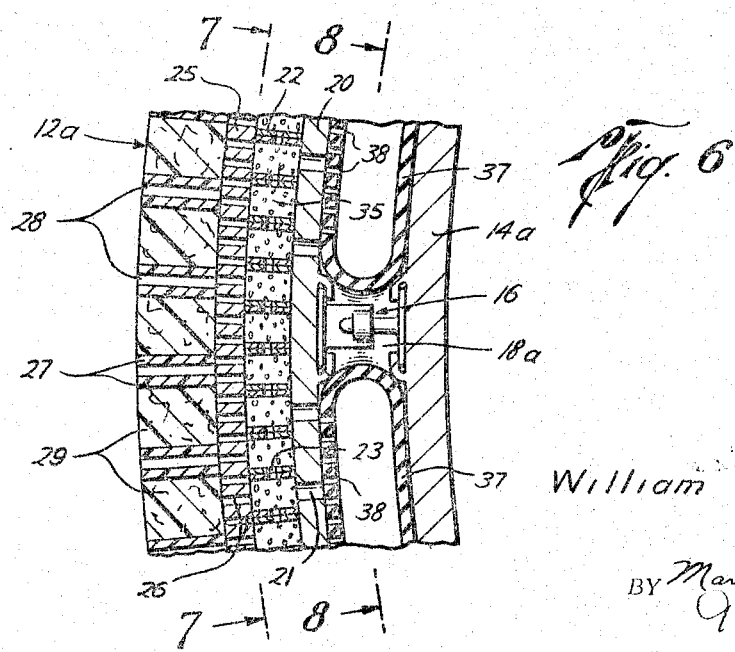
FIG. 6 is an enlarged partial vertical sectional view of the heat ablative system of FIG. 5.

The transpirationally cooled heat ablative system in accordance with the present invention comprises an ablative structure 12 which is mounted on bulkhead 14 of spacecraft 11 by means of spacer supports 16, so that a chamber 18 is formed between ablative structure 12 and bulkhead 14. As seen in FIG. 2, ablative structure 12 comprises a metal substrate 20 (such as aluminum) having openings 21 therethrough and having a metallic honeycomb spacer 22 bonded thereto. The walls of the honeycomb cells have openings 23 therethrough for a purpose that will become obvious below. Plate 25, which is highly perforated with relatively small diameter openings 26, is bonded to spacer 22. A non-metallic honeycomb matrix 27 is positioned on plate 25 and is attached thereto as explained below.

Honeycomb matrix 27 is of the type now commercially available with one exception. Normally, honeycombs of this type are formed from strips of non-metallic fabric (e.g., an epoxy resin reinforced with glass fibers) joined together at intervals to form hexagonal shaped cells. As seen in FIG. 3, the same basic construction is used for forming matrix 27, except instead of the strips being bonded along the entire length $a$, they are bonded only at the end points $b$. The unbonded portion of length $a$ provides the passages 28 for the cooling fluid, as will be explained below.

Before matrix 27 is positioned on plate 25, spacing means (not shown) are placed in passages 28 of matrix to insure that the passages will remain open during and after the filling of the cells of matrix 27 with ablator material. It should be realized that the size of passages 28 is exaggerated in the figures for the sake of clarity, and are much smaller in actual practice. Matrix 27 is then positioned onto plate 25 and filled with the desired ablator material 29. Suitable ablators include, but are not limited to, silicone rubber and formulated compounds based on solutions or dispersions of silicone, epoxy, phenolic, melamine, or acrylic modified with solids such as phenolic microballoons. The ablator 29 is of pasty consistency when injected into the cells of matrix 27, and after all the cells are completely filled the entire structure is heated to cure the ablator. It can easily be seen that some of the ablator 29 will partially flow into those openings 26 in plate 25 which underlie the cells to tightly and securely bond matrix and ablator to plate 25, but that none of the ablator will flow into those openings 26 which underlie passages 28 (see FIG. 3). Due to the small diameter of openings 27 and the high viscosity of filler 29, the filler will not flow through the openings into spacer 22. After the ablator has been cured, the spacing means (not shown) are removed from passages 28, leaving these passages clear from obstruction.

The operation of the transpirationally cooled ablative system shown in FIGS. 1 to 3 inclusive is as follows. At an instant immediately prior to the point of reentry, chamber 18 is filled with fluid under pressure by means of a manifold (not shown) connected to ports 31 in bulkhead 14. The fluid in this particular embodiment is preferably in gaseous form an can be excess nitrogen, helium, ammonia, carbon dioxide, water vapor, combination thereof, or any other non-combustible gas which is available aboard the spacecraft near the end of its flight. The fluid will be forced from chamber 18 through openings 21 in substrate 20, and into spacer 22. Due to openings 23 in the walls of spacer 22, the fluid will diffuse evenly throughout the spacer and will then pass through those openings 26 in plate 25 which underlie passages 28 and onto the surface of ablator material. The actual time of transpirational cooling will vary with the reentry speed, amount of coolant available, etc., but will normally be on the order of 10 to 20 seconds. At the end of this time the heat will begin to char the ablator, as described above, and the char caused by the melting of the ablator will seal off passages 28, thereby preventing the passage of heat therethrough. After the transpirational cooling has ceased and passages 28 are sealed, the heat shield will function as a normal ablative shield to protect the spacecraft from the convective heat and the now much lesser radiative heat still present during reentry.

The modification shown in FIGS. 5 to 8 is very similar to that of FIGS. 1 to 4, except it is designed primarily for use when the coolant is in liquid form. The ablative structure 12a is identical to and is constructed in the same manner as ablative structure 12 set forth above, except that in ablative structure 12a, spacer 22 is filled with a wet open-pore sponge-like foam 35 for a purpose explained below. Also, in this modification a plurality of inflatable bladders 37, each having a plurality of pin-sized holes 38 through the upper portion thereof, are positioned in chamber 18a and are connected to a coolant supply manifold (not shown) through ports 31a in bulkhead 14a. These bladders are positioned within the chamber in such a pattern that when they are inflated with liquid all adjacent bladders will contact each other at their adjacent points, excepting, of course, those points such as shown in FIG. 8 where supports 16 are positioned. It should be understood that one large bladder conforming to the shape of chamber 18a and having sealed openings therethrough for supports 16 could be used in place of a plurality of bladders without departing from the scope of this invention.

The operation of the embodiment shown in FIGS. 5 to 8 is as follows. At an instant immediately prior to reentry, liquid such as urine, liquid water, silanes, ethylene glycol, or the like, from the spacecraft is injected into bladders 37 from a manifold (not shown). The bladders will quickly inflate and will fill chamber 18a with the exception of those spaces immediately adjacent spacer supports 16. The pressure generated by the liquid will force some out pin-holes 38 and through openings 21 of substrate 20. The affinity of foam 35 for the liquid diffuses same throughout spacer 22, and when the foam becomes saturated, the liquid therein will be forced through those openings 26 which underlie passages 28 and onto the surface of the ablator material. As in the previous modification, once the transpirational cooling has ceased the char formed by the melting of the ablator will seal passages 28, and the shield then begins to function as an ordinary ablative shield.

It should be understood that the foregoing disclosure relates only to the preferred embodiments of the invention and that modifications could be made thereto without departing from the spirit and scope of the invention. For example, in some instances the plate 25 and spacer 22 could be eliminated from both modifications, and a honeycomb without passages 28 therein could be filled with ablative material and joined directly to substrate 20. A plurality of small holes could then be drilled through both the cured ablative material and substrate 20 to provide communication with the chamber. However, in eliminating spacer 22, the inherent insulating properties of spacer 22 are eliminated and accordingly, a system without spacer 22 would not withstand or dissipate as much heat as one with it.

What is claimed and desired to be secured by Letters Patent is:

1. In combination:
    a spacecraft having a bulkhead and adapted to enter an atmosphere at velocities wherein substantial components of both radiative and convective heat will be created and transferred to said bulkhead and then to the interior of said spacecraft; and
    a transpirationally cooled, heat insulating and ablative system for substantially retarding the transfer of said heat to the interior of said spacecraft, said system comprising:
    a heat insulating and ablative means having a plurality of open passages therethrough;
    means mounting said heat and ablative means on said bulkhead at a speced interval therefrom whereby a chamber is formed between said ablative means and said bulkhead, said chamber being in communication with said passages through said ablative means; said bulkhead having openings therethrough opening into said chamber; and
    expansible means positioned within said chamber and adapted to be connected through said openings in said bulkhead to a means within said spacecraft for injecting a cooling fluid into said expansible means immediately prior to reentry of said spacecraft into the atmosphere, said expansible means having a plurality of openings therein which communicate with said passages through said ablative means when said expansible means is expanded so that fluid injected into said expansible means will flow out said passages through said ablative means and onto the surface of said ablative means to cool same.

2. The combination as set forth in claim 1 wherein said heat insulating and ablative means comprises:
    a substrate having a plurality of openings therethrough;
    a honeycomb spacer means secured to said substrate and having openings through the walls of the cells thereof so that all adjacent cells are in communication with each other;
    a plate having a plurality of perforations therethrough secured to said spacer means; and
    a honeycomb matrix filled with ablative material and having passages between the cells thereof, said matrix secured to said plate so that each of said passages therein is in communication with some of said perforations in said plate.

3. A transpirationally cooled, heat insulating and ablative system for a reentry spacecraft comprising:
    a bulkhead at the leading edge of the spacecraft having openings therethrough;
    a heat insulating and ablative means having passages therethrough;
    means mounting said heat insulating and ablative means on said bulkhead at a spaced interval therefrom, whereby a chamber is formed between said ablative means and said bulkhead with said passages in said ablative means being in communication with said chamber; and
    expansible means positioned within said chamber adapted to be connected to a fluid supply source through said openings in said bulkhead, said expansible means having openings therein which communicate with said passages in said ablative means when said expansible means are expanded.

4. A transpirationally cooled, heat insulating and ablative system as set forth in claim 3 wherein said heat insulating and ablative means comprises:
    a substrate having a plurality of openings therethrough;
    a honeycomb spacer means secured to said substrate and having openings through the walls of the cells thereof so that all adjacent cells are in communication with each other;
    a plate having a plurality of perforations therethrough secured to said spacer means; and
    a honeycomb matrix filled with ablative material and having passages between the cells thereof, said matrix secured to said plate so that each of said passages therein is in communication with some of said perforations in said plate.

5. A transpirationally cooled, heat insulating and ablative system as set forth in claim 4, wherein said heat insulating and ablative means includes an open-pore foam material positioned in the cells of said honeycomb spacer means.

6. A transpirationally cooled, heat insulating and ablative system as set forth in claim 4 wherein said expansible means comprises a plurality of elastic bladders.

7. In combination:
    a spacecraft having a bulkhead and adapted to enter an atmosphere at velocities wherein substantial components of both radiative and convective heat will be created and transferred to said bulkhead and then to the interior of said spacecraft; and
    a transpirationally cooled, heat insulating and ablative system for substantially retarding the transfer of said heat to the interior of said spacecraft, said system comprising:
    a substrate having a plurality of openings therethrough;
    means mounting said substrate on said bulkhead at a spaced interval therefrom whereby a chamber is formed between said substrate and said bulkhead;
    a honeycomb spacer means secured to said substrate and having openings through the walls of the cells thereof so that all adjacent cells are in communication with each other;
    a plate having a plurality of perforations therethrough secured to said spacer means; and
    a honeycomb matrix filled with ablative material and having passages between the cells thereof, said matrix secured to said plate so that each of said passages therein is in communication with some of said perforations in said plate;

said bulkhead having passages therethrough which are in communication with said chamber and which are adapted to be connected to a means within said spacecraft for injecting a cooling fluid into said chamber immediately prior to reentry of said spacecraft into the atmosphere, whereby such fluid can pass from the chamber through said substrate, through said spacer and plate, and out the passages in said honeycomb matrix onto the surface of said ablative material to cool same.

8. A transpirationally cooled, heat insulating and ablative system for a reentry spacecraft comprising:

a bulk head adapted to be secured at the leading edge of the spacecraft and having openings therethrough adapted to be connected to a cooling fluid supply source;

a substrate having a plurality of openings therethrough;

means mounting said substrate on said bulkhead at a spaced interval therefrom whereby a chamber is formed between said substrate and said bulkhead which is in communication with said openings in said bulkhead;

a honeycomb spacer means secured to said substrate and having openings through the walls of the cells thereof so that all adjacent cells are in communication with each other;

a plate having a plurality of perforations therethrough secured to said spacer means; and a honeycomb matrix filled with ablative material and having passages between the cells thereof, said matrix secured to said plate so that each of said passages therein is in communication with some of the perforations in said plate whereby fluid supplied through said openings in said bulkhead will pass through said chamber, through said spacer and said plate, and out the passages in said honeycomb matrix onto the surface of the ablative material to cool same.

References Cited by the Examiner
UNITED STATES PATENTS

| 2,941,759 | 6/1960 | Rice et al. | 244—117 |
| 3,267,857 | 8/1966 | Lindberg | 102—92.5 |

References Cited by the Applicant
UNITED STATES PATENTS

| 2,556,470 | 6/1951 | Del Mar. |
| 3,130,940 | 4/1964 | Erb et al. |
| 3,153,320 | 10/1964 | Prosser. |

FERGUS S. MIDDLETON, *Primary Examiner.*